(12) United States Patent
Welsh et al.

(10) Patent No.: US 11,816,545 B2
(45) Date of Patent: Nov. 14, 2023

(54) OPTIMIZING MACHINE LEARNING MODELS

(71) Applicant: OctoML, Inc., Seattle, WA (US)

(72) Inventors: Matthew Welsh, Seattle, WA (US); Jason Knight, San Diego, CA (US); Jared Roesch, Seattle, WA (US); Thierry Moreau, Seattle, WA (US); Adelbert Chang, Cupertino, CA (US); Tianqi Chen, Pittsburgh, PA (US); Luis Henrique Ceze, Seattle, WA (US); An Wang, Seattle, WA (US); Michal Piszczek, Seattle, WA (US); Andrew McHarg, Kirkland, WA (US); Fletcher Haynes, Redmond, WA (US)

(73) Assignee: OCTOML, INC., Seattle, WA (US)

( * ) Notice: Subject to any disclaimer, the term of this patent is extended or adjusted under 35 U.S.C. 154(b) by 0 days.

(21) Appl. No.: 17/522,830

(22) Filed: Nov. 9, 2021

(65) Prior Publication Data
US 2022/0172119 A1 Jun. 2, 2022

Related U.S. Application Data

(63) Continuation of application No. 17/183,066, filed on Feb. 23, 2021, now Pat. No. 11,216,752.

(60) Provisional application No. 63/120,017, filed on Dec. 1, 2020.

(51) Int. Cl.
| | |
|---|---|
| G06N 20/00 | (2019.01) |
| G06F 8/35 | (2018.01) |
| G06F 18/214 | (2023.01) |
| G06F 18/21 | (2023.01) |

(52) U.S. Cl.
CPC ............... *G06N 20/00* (2019.01); *G06F 8/35* (2013.01); *G06F 18/214* (2023.01); *G06F 18/217* (2023.01)

(58) Field of Classification Search
CPC .................................. G06F 8/35; G06N 20/00
USPC .......................................................... 706/12
See application file for complete search history.

(56) References Cited

U.S. PATENT DOCUMENTS

| | | |
|---|---|---|
| 9,269,057 B1 | 2/2016 | Chandra et al. |
| 9,442,696 B1 | 9/2016 | Koh et al. |
| 11,216,752 B1 * | 1/2022 | Welsh ................. G06N 20/00 |
| 2013/0268466 A1 | 10/2013 | Baek et al. |
| 2015/0242760 A1 | 8/2015 | Miao et al. |
| 2016/0110657 A1 | 4/2016 | Gibiansky et al. |
| 2016/0300156 A1 | 10/2016 | Bowers et al. |
| 2017/0103267 A1 | 4/2017 | Mishra et al. |

(Continued)

OTHER PUBLICATIONS

International Search Report and Written Opinion, dated Apr. 4, 2022, for International Patent Application No. PCT/US2021/061445. (13 pages).

(Continued)

*Primary Examiner* — John Q Chavis
(74) *Attorney, Agent, or Firm* — SEED IP LAW GROUP, LLP

(57) ABSTRACT

A facility for optimizing machine learning models is described. The facility obtains a description of a machine learning model and a hardware target for the machine learning model. The facility obtains optimization result data from a repository of optimization result data. The facility optimizes the machine learning model for the hardware target based on the optimization result data.

28 Claims, 15 Drawing Sheets

(56) References Cited

U.S. PATENT DOCUMENTS

| | | |
|---|---|---|
| 2018/0260687 A1 | 9/2018 | Kanno et al. |
| 2018/0267499 A1 | 9/2018 | Tsuneki et al. |
| 2018/0284703 A1 | 10/2018 | Sonoda et al. |
| 2018/0314945 A1 | 11/2018 | Breternitz et al. |
| 2019/0043487 A1 | 2/2019 | Rivkin |
| 2019/0050751 A1 | 2/2019 | Assem Aly Salama et al. |
| 2019/0156246 A1 | 5/2019 | Kuo et al. |
| 2019/0220783 A1 | 7/2019 | Nookula et al. |
| 2019/0391796 A1 | 12/2019 | Brady et al. |
| 2020/0065772 A1 | 2/2020 | Whitehead et al. |
| 2020/0074230 A1 | 3/2020 | Englard et al. |
| 2020/0082247 A1 | 3/2020 | Wu et al. |
| 2020/0250515 A1 | 8/2020 | Rifkin et al. |
| 2020/0311520 A1 | 10/2020 | Zhao et al. |
| 2020/0372307 A1 | 11/2020 | Arun et al. |

OTHER PUBLICATIONS

"AWS IoT Greengrass Developer Guide, Version 1," Amazon Web Services. (2017) https://docs.aws.amazon.com/greengrass/, (Year: 2017).

Chen et al., "TVM: An automated end-to-end optimizing compiler for deep learning," 13th {USENIX} Symposium on Operating Systems Design and Implementation ({OSDI} 18). 2018. (Year: 2018).

* cited by examiner

FIG. 4 machine learning model partition data table 400

| Model ID | Model type | Partition | Implementation |
|---|---|---|---|
| 1111 | Deep Neural Network | [Conv2d 5x5 s1 c8 pad=true, Add, Relu, MaxPool 2x2 s2] | fa 96 51 c0 58 39 75 33 ac f8 ec 02 4a e9 91 32 59 9b 5e 53 ... |
| 1111 | Deep Neural Network | [Conv2d 5x5 s1 c16 pad=true, Add, Relu, MaxPool 3x3 s3] | e0 21 c7 5d 73 a3 17 3a 08 7e f6 92 b1 9b db 5c af 5e a5 b4... |
| 2222 | Recurrent Neural Network | [Rec2d 3x3 s1 c8 pad=true, Add, Relu, MaxPool 3x3 s3] | c0 21 a7 1d 73 a3 17 3b 08 7e f6 18 b1 9b cd 5c af 2f a0 b9... |
| ... | ... | ... | ... |

420 421 422 423

401 402 403 optimization result data table

| Model Type | Hardware Target | Implementation | Time to Execute (ms) | |
|---|---|---|---|---|
| Deep Neural Network | NVIDIA V100 | fa 96 51 c0 58 39 75 33 ac f8 ec 02 4a e9 91 32 59 9b 5e 53 ... | 8 | 501 |
| Deep Neural Network | Raspberry PI4 Model B | e0 21 c7 5d 73 a3 17 3a 08 7e f6 92 b1 9b db 5c af 5e a5 b4... | 500 | 502 |
| Recurrent Neural Network | Nvidia GTX 1060 | c0 21 a7 1d 73 a3 17 3b 08 7e f6 18 b1 9b cd 5c af 2f a0 b9... | 15 | 503 |
| Random Forest | NVIDIA A100 | d0 73 a7 29 b1 a3 17 3a 08 7e ec 02 4a e9 91 32 af 2f a0 b9... | 1 | 504 |
| ⋮ | ⋮ | ⋮ | ⋮ | |
| 520 | 521 | 522 | 523 | |

| device information data table | | | | |
|---|---|---|---|---|
| Device ID | Hardware | Diagnostic Data | Active | Available |
| 817 | NVIDIA V100; Intel Xeon | CPU: 90%; Connection: Stable; Memory: 50% | True | False |
| 994 | Raspberry PI4 Model B | CPU: 0%; Connection: Disconnected; Memory: 0% | False | False |
| 789 | Nvidia GTX 1060; AMD Ryzen 3600 | CPU: 10%; Connection: Stable; Memory: 10% | True | True |
| ... | ... | ... | ... | ... |

FIG. 14

OPTIMIZING MACHINE LEARNING MODELS

CROSS-REFERENCE TO RELATED APPLICATIONS

This patent application claims priority from U.S. patent application Ser. No. 17/183,066 filed on Feb. 23, 2021 which claims priority to U.S. provisional patent application Ser. No. 63/120,017 filed on Dec. 1, 2020 and entitled "OPTIMIZING MACHINE LEARNING MODELS".

In cases where the present application conflicts with a document incorporated by reference, the present application controls.

BACKGROUND

Machine learning models are increasingly used to provide artificial intelligence for data analytics, software applications, etc. As models become larger or more complex, the resource cost to use the model increases. Additionally, each model may run differently on different hardware, such that a model which operates efficiently on a certain device type will require more resources and operate less efficiently on a different device type.

BRIEF DESCRIPTION OF THE DRAWINGS

FIG. 4 is a table diagram depicting a machine learning model partition data table used by the facility in some embodiments.

FIG. 5 is a table diagram depicting an optimization result data table used by the facility in some embodiments.

FIG. 8 is a model list screen presented by the facility in some embodiments.

FIG. 14 is a device information data table used by the facility in some embodiments.

DETAILED DESCRIPTION

Figure 1:
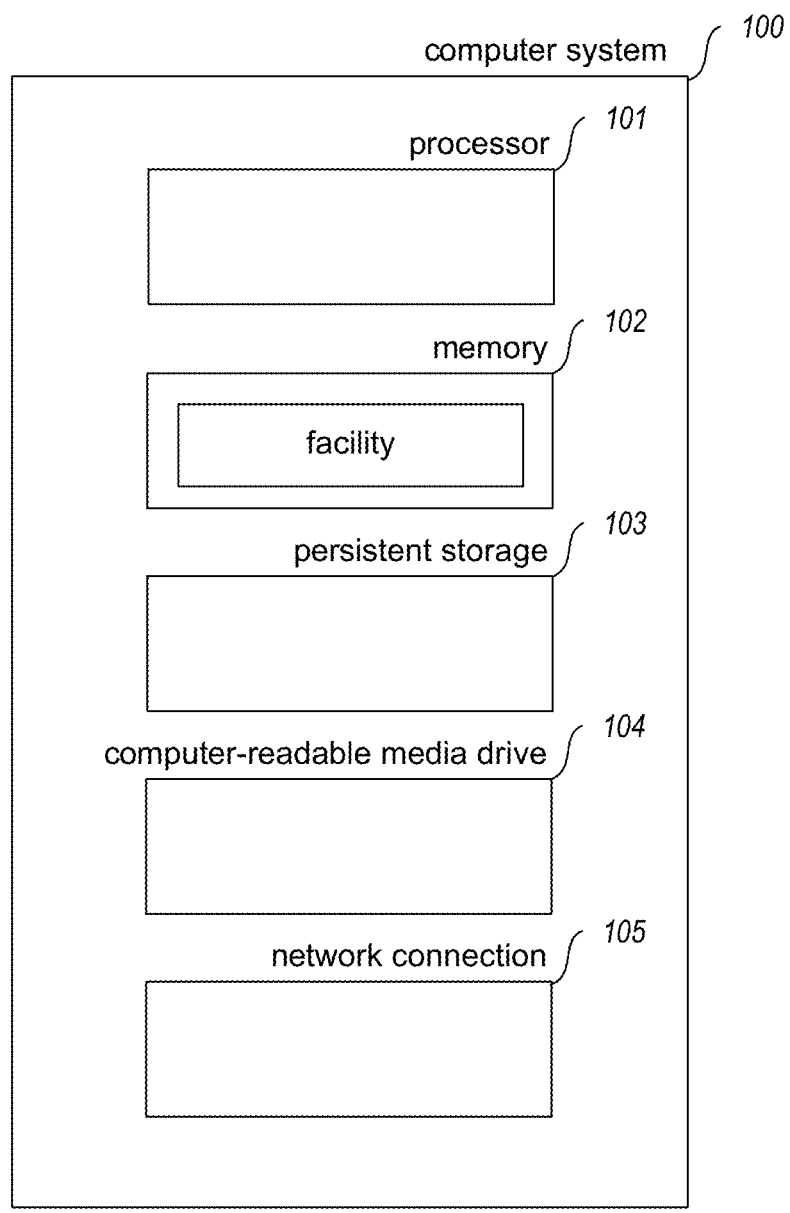
FIG. 1 is a block diagram showing some of the components typically incorporated in at least some of the computer systems and other devices on which the facility operates.

The inventors have recognized that it would be of great benefit to developers, data scientists, etc., to optimize their machine learning models to allow the models to operate efficiently when deployed. The inventors have also determined that it would be beneficial to automate the process of optimizing machine learning models to allow users of the machine learning models to target a variety of device types.

One method of optimizing existing machine learning models uses Apache TVM, a machine learning model compiler, described in Chen, et al., in "TVM: An Automated End-to-End Optimizing Compiler for Deep Learning", 13th USENIX Symposium on Operating Systems Design and Implementation, Oct. 5, 2018, which is hereby incorporated by reference in its entirety. In cases where the present application conflicts with a document incorporated by reference, the present application controls.

TVM operates by obtaining a description of a machine learning model to be optimized (a "subject model") in the form of a machine learning exchange format such as CoreML, ONNX, etc. TVM then transforms the description into a computational graph representation of the model and generates code for each operator in the graph. It then identifies possible code implementations for each operator for a given hardware target. A machine learning model is used to find the best code implementations for each operator. These are used to create a deployable optimized machine learning model.

The inventors have recognized a variety of disadvantages of using TVM to optimize a subject model. First, TVM performs the entire optimization process from the beginning every time it is used to optimize a subject model without "learning" from previous optimizations. This means TVM must optimize a subject model with a similar structure to a previously optimized model without using the optimization of the previously optimized model as a starting point. Second, while TVM allows a user to optimize a subject model for a specific device type, its user must acquire every piece of hardware, such as GPUs, CPUs, mobile devices, microcontrollers, etc., that the user plans to target, and manually test models compiled by TVM on each of these hardware targets.

In response to recognizing these disadvantages, the inventors have conceived and reduced to practice a software and/or hardware facility for optimizing machine learning models ("the facility"). By using past data from model optimizations as a starting point, the facility enables a user to obtain an optimized version of a subject model more quickly than by using TVM on its own by using past data from model optimization as a starting point. The facility additionally allows a user to obtain an optimized version of a subject model for different hardware targets without requiring the user to obtain or operate the hardware on their own.

In the present application, references to "optimizing," "optimization," "optimize," etc. means improving or seeking to improve the efficiency of aspects of a model. As a result, optimization can occur even if the facility fails to identify a more efficient implementation of the model or of aspects of the model, or the most efficient possible implementation of the model or aspects of the model.

In some embodiments, the facility obtains a description of a subject model from its designer. In some embodiments, the description of the subject model is in the form of a machine learning exchange format such as CoreML, ONNX, etc. In some embodiments, the facility obtains a trained subject model. In some embodiments, the facility obtains training data for a subject model. In some embodiments, as part of optimizing the subject model, the facility trains the subject model. In some embodiments, where the facility receives a trained subject model, the facility verifies that the optimized subject model produces a similar result to the un-optimized subject model. In some embodiments, the facility receives the weights used by the subject model. In some embodiments, as part of optimizing the subject model the subject model optimizes the weights, such as by pruning weights close to zero. In some embodiments, the facility trains and optimizes the subject model concurrently.

In some embodiments, the facility stores, or "logs," optimization result data produced while optimizing a subject model. In some embodiments, the optimization result data includes data indicating optimizations for specific operators used by machine learning models. In some embodiments, the optimization result data includes data indicating the type of model the optimization result data is related to. In some embodiments, the optimization result data includes data indicating the hardware that the optimization result data is related to.

In some embodiments, the facility obtains machine learning models from sources including machine learning repositories, or "model zoos," such as the ONNX model zoo, MXNet Model Zoo, etc. In some embodiments, the facility optimizes models retrieved from machine learning repositories. In some embodiments, the facility logs optimization result data produced from optimizing the models retrieved from machine learning model repositories. In some embodiments, the facility optimizes a subject model by using the optimization result data as a starting point for optimizing the subject model. In some embodiments, the optimization result data that the facility uses to optimize a subject model includes optimization result data from one or more models determined by the facility to be similar to the subject model.

In some embodiments, the facility manages a "device farm" in which target devices of a variety of types are used to test the execution of candidate implementations of the subject model. In some embodiments, the facility chooses one or more of these target devices to optimize the subject model based on comparing the device's hardware and the hardware target of the subject model.

In some embodiments, the facility uses a tracker to manage the state of the target devices in the device farm. In some embodiments, the tracker obtains diagnostic data related to each of the target devices, such as an IP address, device uptime, and other device health metrics. In some embodiments, the tracker removes devices from an active device pool, a list indicating active devices, based on the diagnostic data. In some embodiments, the facility optimizes the subject model by using devices designated as an active device as indicated by the active device pool. In some embodiments, the tracker determines whether a device with the specified hardware target can be used to optimize a subject model. In some embodiments, the tracker indicates to the facility that a device with the specified hardware target cannot be used by the facility.

In some embodiments, the facility communicates directly with a device when optimizing a subject model. In some embodiments, the facility provides the device with code representing a portion of the subject model, and receives an indication of the device's performance when running the portion of the subject model, such as total execution time. In some embodiments, the code representing a portion of the subject model is pre-compiled. In some embodiments, the facility compiles the code representing a portion of the subject model before providing the device with the code. In some embodiments, the facility provides the device with configuration parameters along with the portion of the subject model. In some embodiments, the device performance includes the time required to run the code representing a portion of the subject model. In some embodiments, the device reports its performance when running the code to the tracker. In some embodiments, the tracker is configured to manage running code on a plurality of devices for a plurality of subject models. In some embodiments, if a device does not report the performance of a subject model after a predetermined period of time, the tracker assigns the task of measuring performance of the subject model to another device.

In some embodiments, the facility uses the tracker to distribute multiple optimizations of the subject model, or of portions of the subject model, to multiple devices in order to test each optimization. In some embodiments, the code provided to the device is idempotent, and can be rerun multiple times to obtain additional data regarding the device performance when running the code. In some embodiments, the tracker can communicate with any device using a predetermined communication protocol, such as TCP/IP, HTTP, etc. In some embodiments, the tracker assigns code representing portions of the subject model to the plurality of device based on the first devices available, i.e. "first come, first served." In some embodiments, when assigning code to a device, the tracker employs a scheduling algorithm which takes into account multiple factors, such as the expected time to execute the code, the status of the user, the pending workload for multiple users, etc.

By performing in some or all of the ways described above, the facility is able to quickly and reliably optimize the performance of subject models submitted by users, with limited input and control from those users.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by applying optimizations for machine learning models similar to the subject model, the facility is able to quickly and efficiently optimize the subject model to increase its performance on a specified hardware target, enabling that hardware target available to perform more model evaluations in a given period of time than it otherwise could. Additionally, the facility is able to reduce the amount of processing resources required to optimize the subject model by using shortcuts, such as applying optimizations for machine learning models similar to the subject model.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, Neural Network Accelerator, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
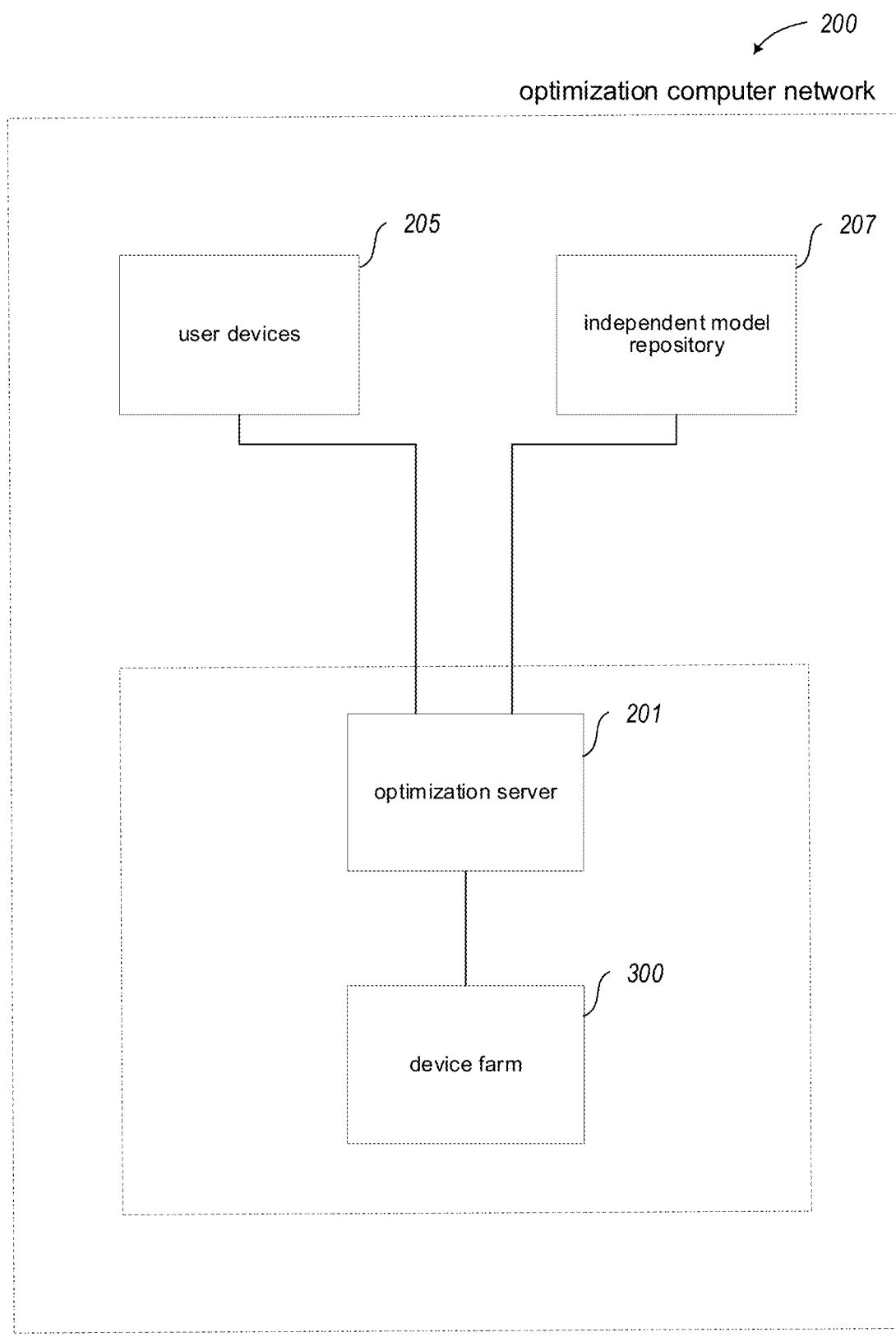
FIG. 2 is a block diagram showing some of the components typically incorporated in an optimization computer network used by the facility in some embodiments.

FIG. 2 is a block diagram showing some of the components typically incorporated in an optimization computer network 200 used by the facility in some embodiments. The optimization computer network 200 includes an optimization server 201, one or more user devices 205, one or more independent model repositories 207, and a device farm 300. The device farm 300 is further described below in connection with FIG. 3. The optimization server 201 obtains machine learning model data, such as model definitions, training data, etc., from the user devices 205 and the independent model repository 207. The optimization server 201 partitions a machine learning model indicated by the machine learning model data into one or more partitions of the machine learning model. These partitions each include implementations of a portion of the code that makes up the machine learning model, such that each part of the machine learning model is represented in at least one of the partitions. The optimization server 201 additionally transmits implementations of the machine learning models indicated by the machine learning model data to the device farm 300. The optimization server 201 obtains optimization result data, such as the runtime of implementations of machine learning models, device diagnostic data collected during the execution of implementations of machine learning models, etc., from the device farm 300.

The optimization server 201 stores optimization result data along with data describing the optimization result data such as the type of machine learning model, an implementation of the machine learning model, hardware targets for the machine learning model, descriptions of the machine learning model, etc. The optimization server 201 then uses the stored optimization result data to optimize machine learning models. In some embodiments, the optimization server 201 comprises one or more computing devices similar to the computer systems or devices described in connection with FIG. 1. In some embodiments, the optimization server 201 performs some or all of the functions described with respect to FIGS. 4-15.

The one or more user devices 205 transmit data describing a machine learning model to the optimization server 201. The one or more user devices 205 receive data indicating an optimized machine learning model from the optimization server 201.

The one or more independent model repositories 207 include machine learning models accessible by the facility. In some embodiments, one or more of the machine learning repositories 207 are available to the public, and/or operated by a different entity than the facility. In some embodiments, the facility accesses the machine learning model repositories to obtain data describing one or more machine learning models. In some embodiments, the machine learning model repositories are "model zoos." Model zoos are typically repositories which include one or more machine learning models, which may have already been trained. The machine learning models included in model zoos are generally available to use, download, etc., for members of the public with access to the model zoo. Members of the public with access to the model zoo may also be able to upload their own machine learning models to the model zoo. Additionally, machine learning models included in model zoos may have already been trained for specific purposes, such as analyzing medical data, analyzing images, analyzing text or speech, etc. The model zoo may also include the training data used to train the machine learning models included within the model zoo.

In some embodiments, the data describing a machine learning model includes a description, or "definition", of the machine learning model, such as "deep learning model," "recursive neural network for sentence recognition," etc. In some embodiments, the data describing a machine learning model includes a hardware target of the machine learning model. In some embodiments, the data describing a machine learning model includes training data for the machine learning model. In some embodiments, the data describing a machine learning model includes weights for the machine learning model.

In some embodiments, the facility includes a list of users. In some embodiments, each user has a user type, status, etc. In some embodiments, a user can upload machine learning models to the facility to optimize the machine learning models. In some embodiments, the facility prioritizes the optimization of a machine learning model based on at least one of the user type, status, etc., of a user associated with the machine learning model.

Figure 3:
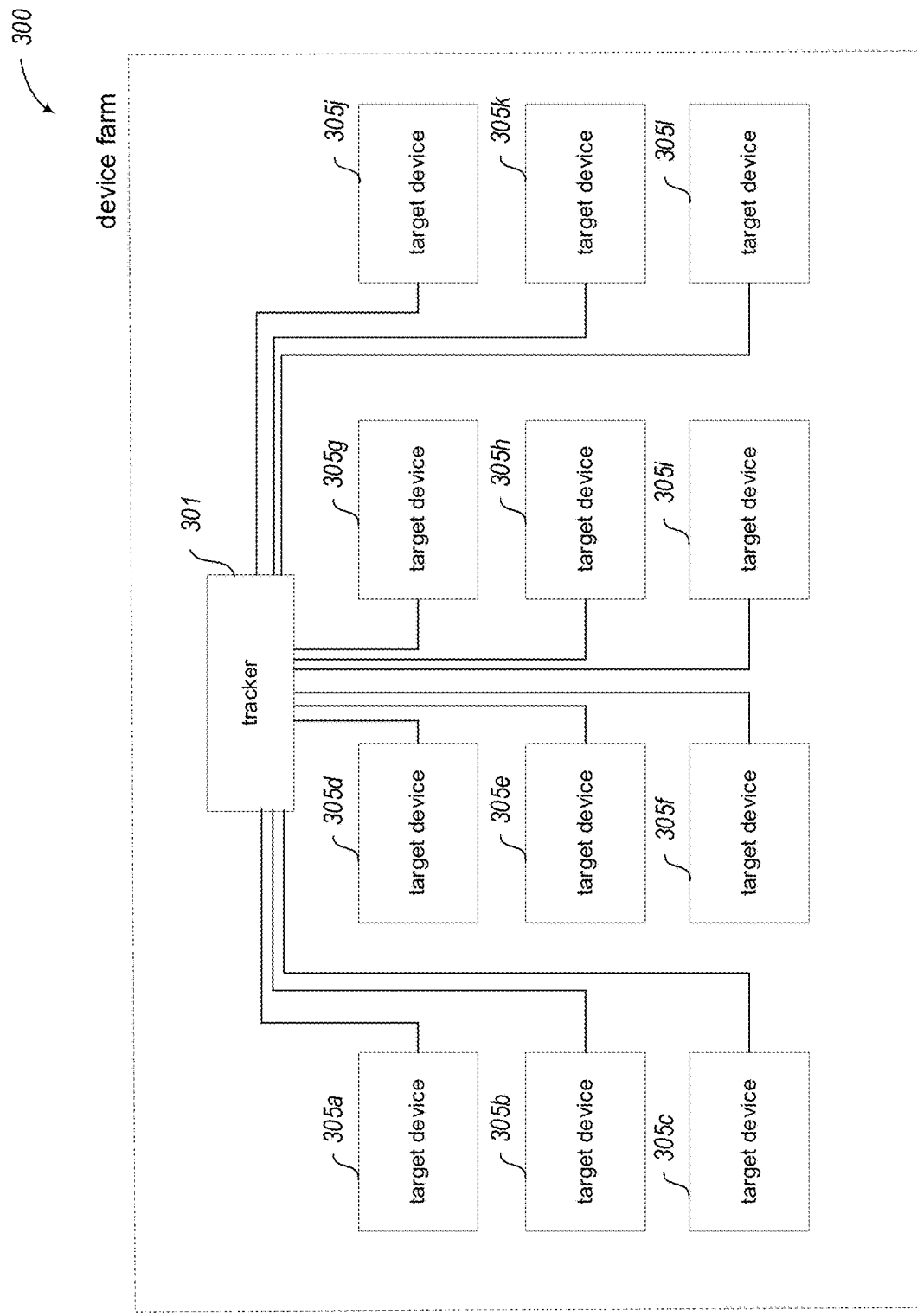
FIG. 3 is a block diagram showing some of the components typically incorporated in a device farm used by the facility in some embodiments.

FIG. 3 is a block diagram showing some of the components typically incorporated in a device farm 300 used by the facility in some embodiments. The device farm 300 includes a tracker 301 and a plurality of target devices 305a-305l. The tracker 301 manages each of the target devices 305a-305l, assigns an implementation of a portion of a machine learning model to the target devices 305a-305l, and receives optimization result data and target device diagnostic data from each of the target devices 305a-305l. In some embodiments, the optimization server 201 implements the tracker 301. In some embodiments, the tracker 301 is a standalone computer device, such as the computer device described in connection with FIG. 1. The target devices 305a-305l each can execute implementation of a portion of a machine learning model, and obtain statistical data regarding the performance of the implementation of the portion of the machine learning model, including runtime, resource usage, etc. In some embodiments, the target devices 305a-305l include computing devices with different types of hardware such as Raspberry Pis, server computers, desktop computers, smartphones, smart sensors, etc. In some embodiments, the tracker 301 communicates with each of the devices 305a-305l by using a network address, such as an IP address, assigned to the device by the tracker 301.

In some embodiments, the tracker keeps a list of devices which are active (an "active device pool"). In some embodiments, the tracker assigns an implementation of a portion of a machine learning model, to a device only if the device is included in the active device pool. In some embodiments, the tracker determines whether it has received diagnostic data from a device within a predetermined period of time. In some embodiments, the tracker removes a device from the active device pool based on a determination that the tracker has not received diagnostic data within the predetermined period of time.

FIG. 4 is a table diagram depicting a machine learning model partition data table 400 used by the facility in some embodiments. The machine learning model partition data table 400 includes a Model ID column 420, a Model type column 421, a Partition column 422, and an Implementation column 423. The Model ID 420 column includes data indicating an identifier for the machine learning model. The model type column 421 includes data indicating the machine learning model's type. The model partition column 422 includes data indicating which partition of the model uses the implementation stored in the Implementation column 423. In some embodiments, the facility splits a machine learning model into multiple partitions; those partitions are each represented in the machine learning model partition data table by a different row, each having the same Model ID in Model ID column 420 and a different partition number in the partition column 422. The implementation column 423 includes data indicating how the specified partition of the machine learning model is implemented. For example, row 401 indicates the first partition of a "Deep Neural Network" and its implementation. Row 402 indicates the second partition of the model in row 401, and an implementation for that partition. The implementation column of each row contains a machine-readable description of the computational operations performed by the associated partition of the model. This may include, for example, machine instructions, abstract representations of numerical operations, etc.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 5 is a table diagram depicting an optimization result data table 500 used by the facility in some embodiments. The optimization result data table 500 includes a Model Type column 520, a Hardware Target column 521, an Implementation column 522, and a Time to Execute column 523. The Model Type column 520 and the Implementation column 522 function similarly to the Model Type column 421 and Implementation column 423 respectively. The Hardware Target column 521 indicates a hardware target on which the implementation indicated by the Implementation column 522 was used. The Time to Execute column 523 includes data indicating the time to execute the implementation of the model, or model partition, on the hardware indicated by the Hardware Target column 521. For example, row 501 indicates that it takes 8 milliseconds to execute the implementation of a Deep Neural Network indicated by Implementation column 522 on an NVIDIA V100. In some embodiments, the optimization result data table includes additional data related to the performance of an implementation such as the resources used by device hardware, diagnostic data related to the device hardware, etc.

Figure 6:
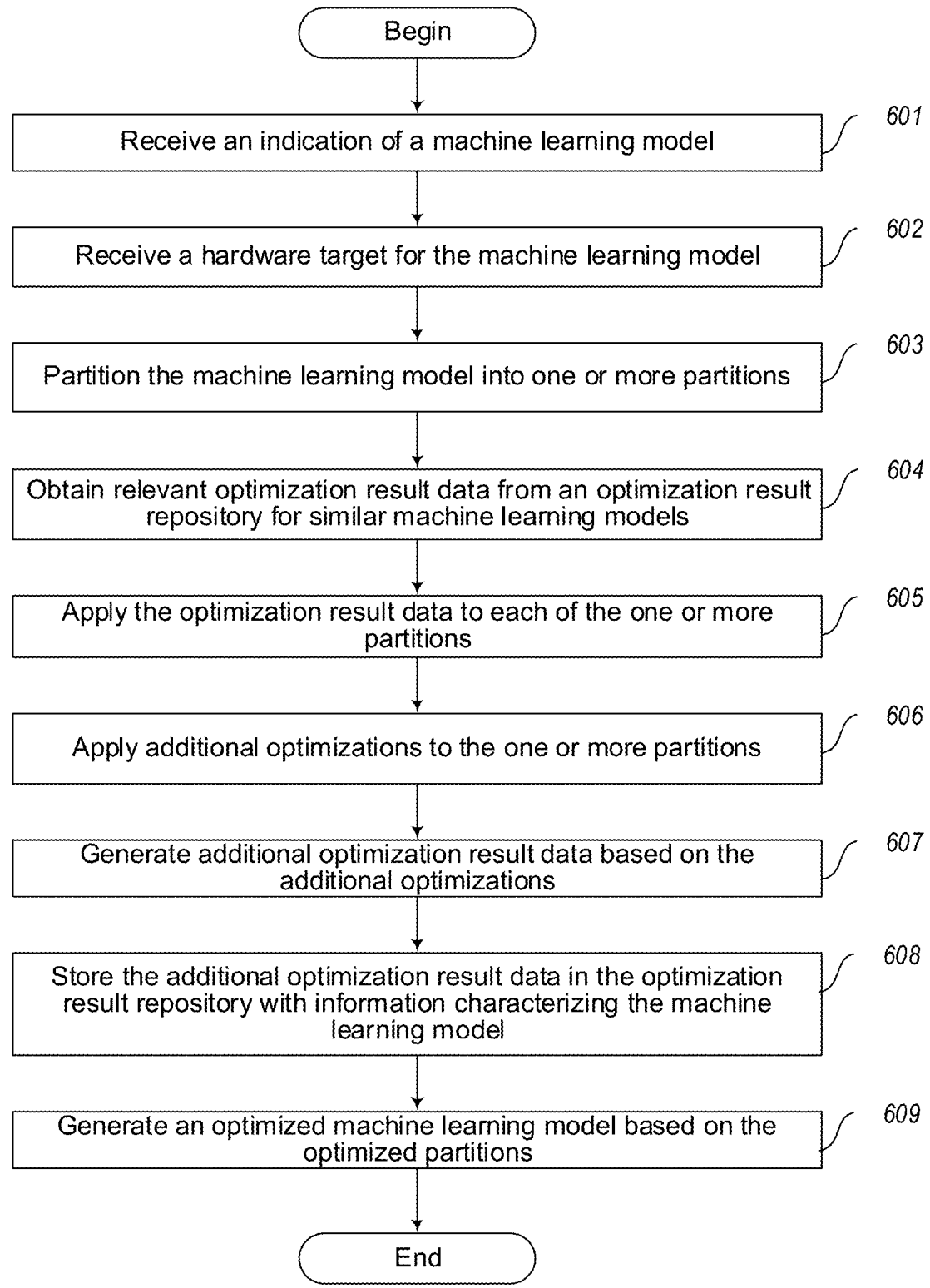
FIG. 6 is a flow diagram of a process to optimize a machine learning model used by the facility in some embodiments.

FIG. 6 is a flow diagram of a process to optimize a machine learning model used by the facility in some embodiments. First, at act 601 the facility receives an indication of a machine learning model. In some embodiments the machine learning model is a trained machine learning model. In some embodiments, the machine learning model is an untrained machine learning model. In some embodiments, the facility receives training data for the machine learning model. In some embodiments, the facility receives test data for the machine learning model. In some embodiments, the facility utilizes a model selection screen to receive the indication of a machine learning model.

Figure 7:
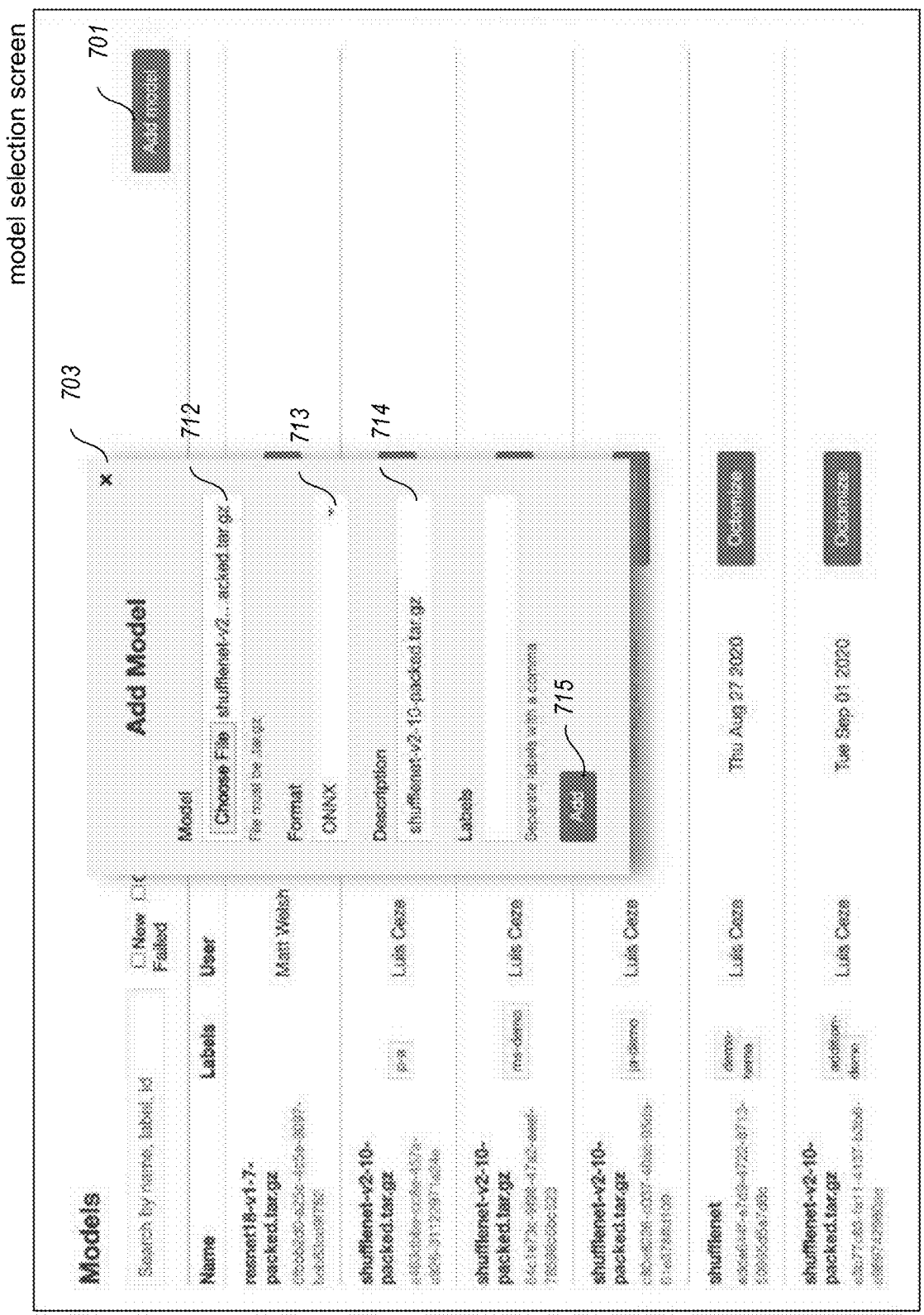
FIG. 7 is a model selection screen presented by the facility in some embodiments.

FIG. 7 is a model selection screen presented by the facility in some embodiments. The model selection screen includes an add model button 701 and an add model dialog box 703. The facility presents the add model dialog box 703 when a user activates the add model button 701. The add model dialog box 703 includes a model selector 712, a format selector 713, a description text-box 714, and an add button 715. The model selector 712 allows a user to provide an indication of a model from a user, such as by uploading a file, entering a hyperlink, etc. The format selector 713 allows a user to specify the format the uploaded model uses, such as ONNX, CoreML, etc. The description text box 714 allows a user to enter a description of the indicated model. When a user activates the add button 715, the model, along with its format, description, and other information, is uploaded to the facility and presented on a model list screen.

Figure 8:
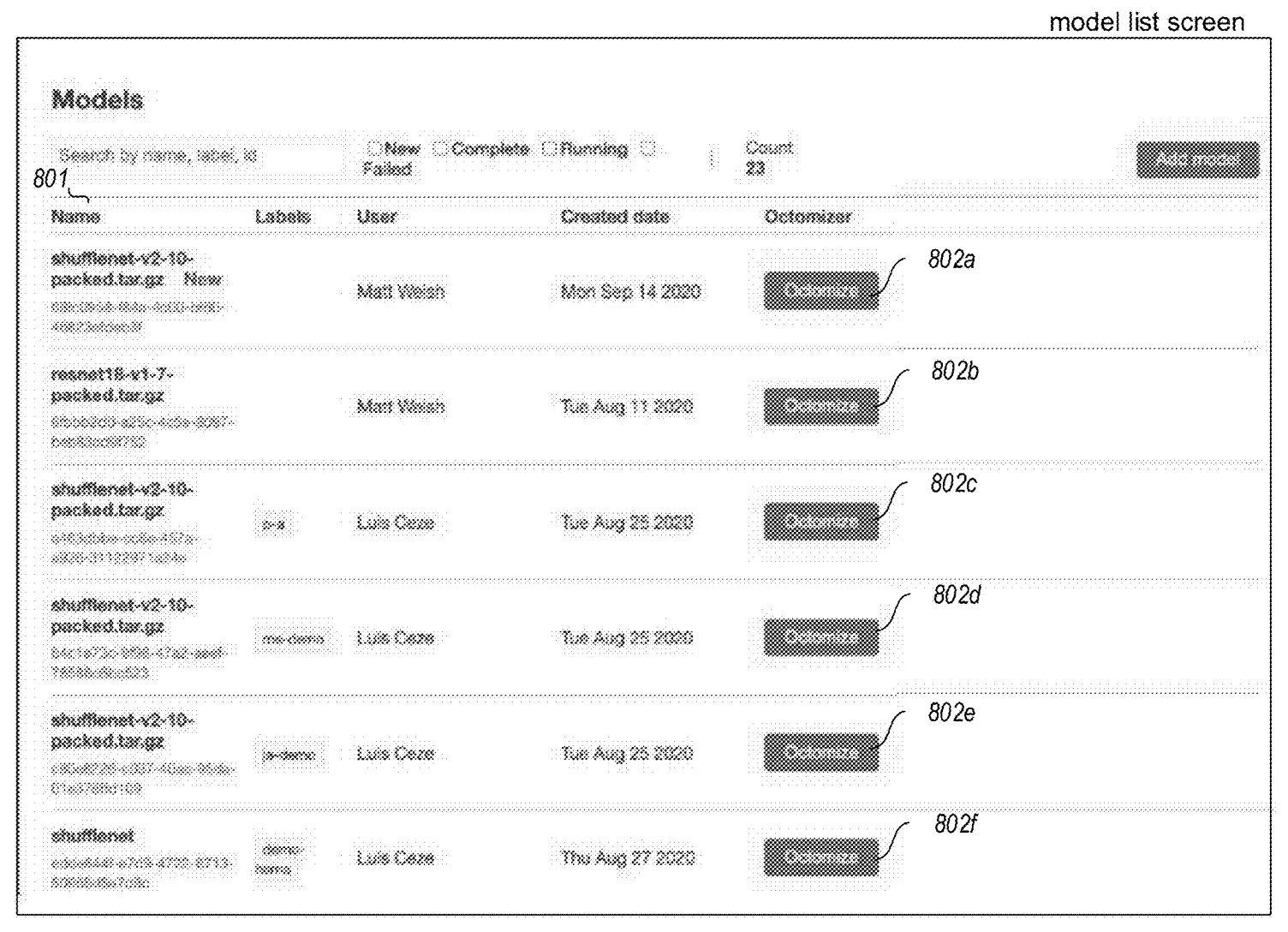

FIG. 8 is a model list screen presented by the facility in some embodiments. The model list screen includes a model list 801 and one or more optimize buttons 802a-802f. The model list 801 displays information describing one or more models, as well as an optimize button 802 for each of the described models. When the user activates an optimize button 802, the facility begins the process of optimizing the model. In some embodiments, the facility displays a model hardware target selection screen as part of beginning the process of optimizing the model.

Returning to FIG. 6, at act 602, the facility receives a hardware target for the machine learning model. In some embodiments, the facility receives the hardware target by using a model hardware target selection screen.

Figure 9:
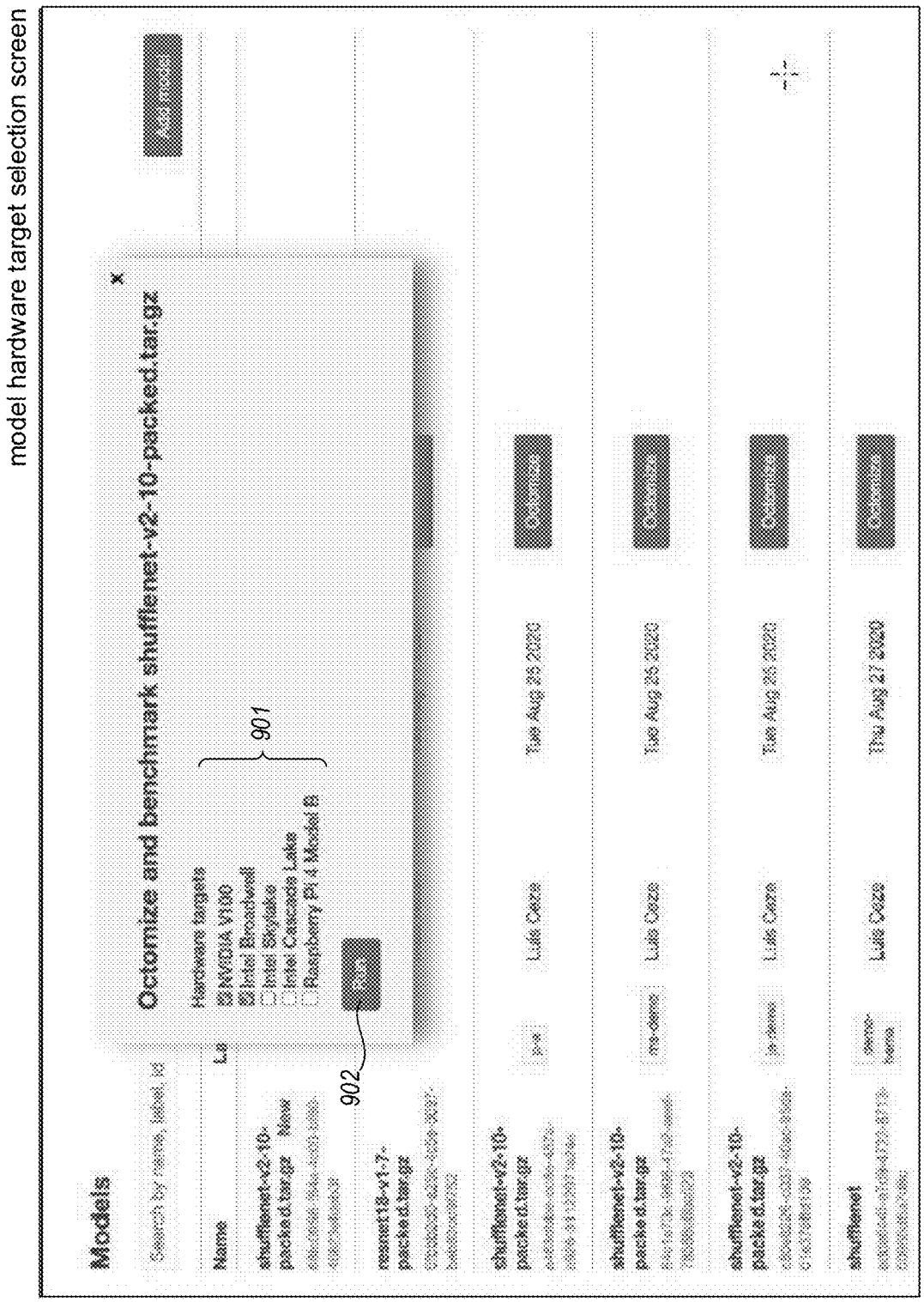
FIG. 9 is a model hardware target selection screen used by the facility in some embodiments.

FIG. 9 is a model hardware target selection screen used by the facility in some embodiments. The model hardware target selection screen includes a hardware target list 901 and a run button 902. The hardware target list 901 includes one or more hardware targets which a user can select to identify which hardware targets the facility should use when optimizing the model. When a user activates the run button 902, the facility continues the process to optimize a machine learning model.

Returning to FIG. 6, at act 603, the facility partitions the machine learning model into one or more partitions. In some embodiments, the facility uses the process described in Chen, et al. to partition the machine learning model. In some embodiments, the facility creates a partition for each operator in the machine learning model. At act 604 the facility obtains relevant optimization data from an optimization result repository for machine learning model similar to the uploaded machine learning models. In some embodiments, the facility determines whether the machine learning models are similar based on the model description, hardware target, model type, etc. In some embodiments the facility obtains a portion of the relevant optimization data by optimizing machine learning models obtained from machine learning model repositories, or "model zoos."

At act 605 the facility applies the obtained optimization result data to each of the partitions of the machine learning model to optimize the partitions. In some embodiments, the partitions of the machine learning model may be optimized in different ways or by using different optimization result data. At act 606, the facility applies additional optimizations to each of the partitions. In some embodiments, the additional optimizations include changing the code implementation used by the partition. In some embodiments, the additional optimizations include changing the weights of the variables used by the machine learning model.

At act 607, the facility generates additional optimization result data based on the additional optimizations for each partition. In some embodiments, the facility generates the additional optimization data by executing the partition of the machine learning model on a device which has the same hardware as the received hardware target. In some embodiments, the facility utilizes a device farm to generate the additional optimization data. In some embodiments, acts 606 and 607 are repeated with different additional optimizations, and the additional optimization data is used to choose a code implementation of the partition.

At act 608, the facility stores the additional optimization result data in the optimization result repository for similar machine learning models. At act 609, the facility generates an optimized machine learning model based on the optimized partitions and the process ends. In some embodiments, after the process to optimize a machine learning model is complete, the facility presents an optimized model list screen.

In some embodiments, where the facility has received training data, the facility trains the machine learning model after optimizing it. In some embodiments, the facility optimizes the machine learning model again after it has been trained. In some embodiments, where the facility obtains test data for the machine learning model, the facility applies the test data to the machine learning model before optimizing the machine learning model and after optimizing the machine learning model to determine whether there is a change in the output of the machine learning model. In some embodiments, the facility determines whether the change in the output of the machine learning model has exceeded a predetermined threshold. In some embodiments, where the change in the output of the machine learning model has exceeded a predetermined threshold, the facility undoes the optimization of the machine learning model and optimizes the machine learning model in a different manner to the original optimization.

Those skilled in the art will appreciate that the acts shown in FIG. 6 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 10:
FIG. 10 is an optimized model list screen presented by the facility in some embodiments.

FIG. 10 is an optimized model list screen presented by the facility in some embodiments. The optimized model list screen includes a list of optimized models, each having a view metrics button 1001 and a download button 1002. In some embodiments, when a user activates the view metrics button 1001, the facility presents a model performance screen. In some embodiments, when a user activates the download button 1002, the facility presents a model download screen.

Figure 11:
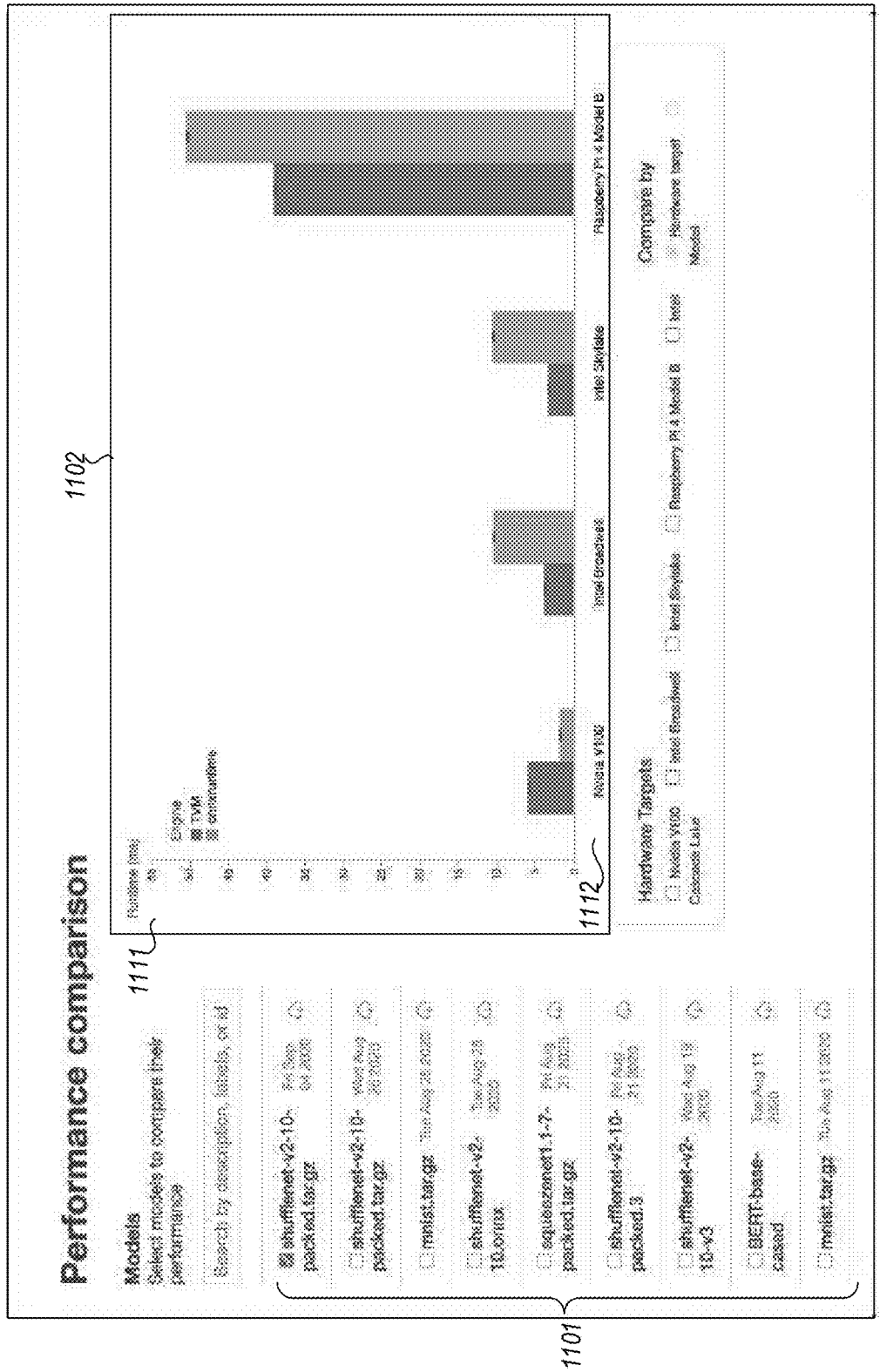
FIG. 11 is a model performance screen presented by the facility in some embodiments.

FIG. 11 is a model performance screen presented by the facility in some embodiments. The model performance screen includes a model list 1101, and a performance graph 1102. The model list 1101 includes each of the optimized models. The facility displays performance data related to models selected in the model list 1101 in the performance graph 1102. The performance graph 1102 includes a runtime axis 1111 and a hardware target axis 1112. The performance graph displays the performance of the model after optimization using the bars on the left and the performance of the model before the optimization by using the bars on the right.

For example, the Raspberry PI 4 Model B had a runtime of about 50 ms before optimization and a runtime of less than 40 ms after optimization.

Figure 12:
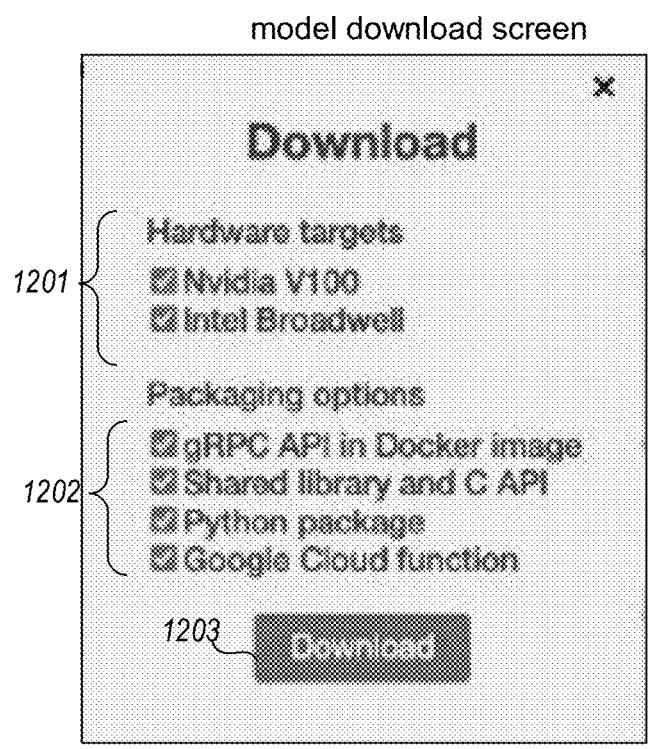
FIG. 12 is a model download screen presented by the facility in some embodiments.

FIG. 12 is a model download screen presented by the facility in some embodiments. The model download screen includes a hardware target list 1201, a packaging options list 1202, and a download button 1203. The download list 1201 includes the hardware targets for which the selected machine learning model has been optimized. The packaging options list 1202 includes different options for packaging the machine learning model before downloading. When a user activates the download button 1203, the facility packages the optimized machine learning model for each of the selected hardware targets and packaging options, and allows the user to download the packaged machine learning model.

Figure 13:
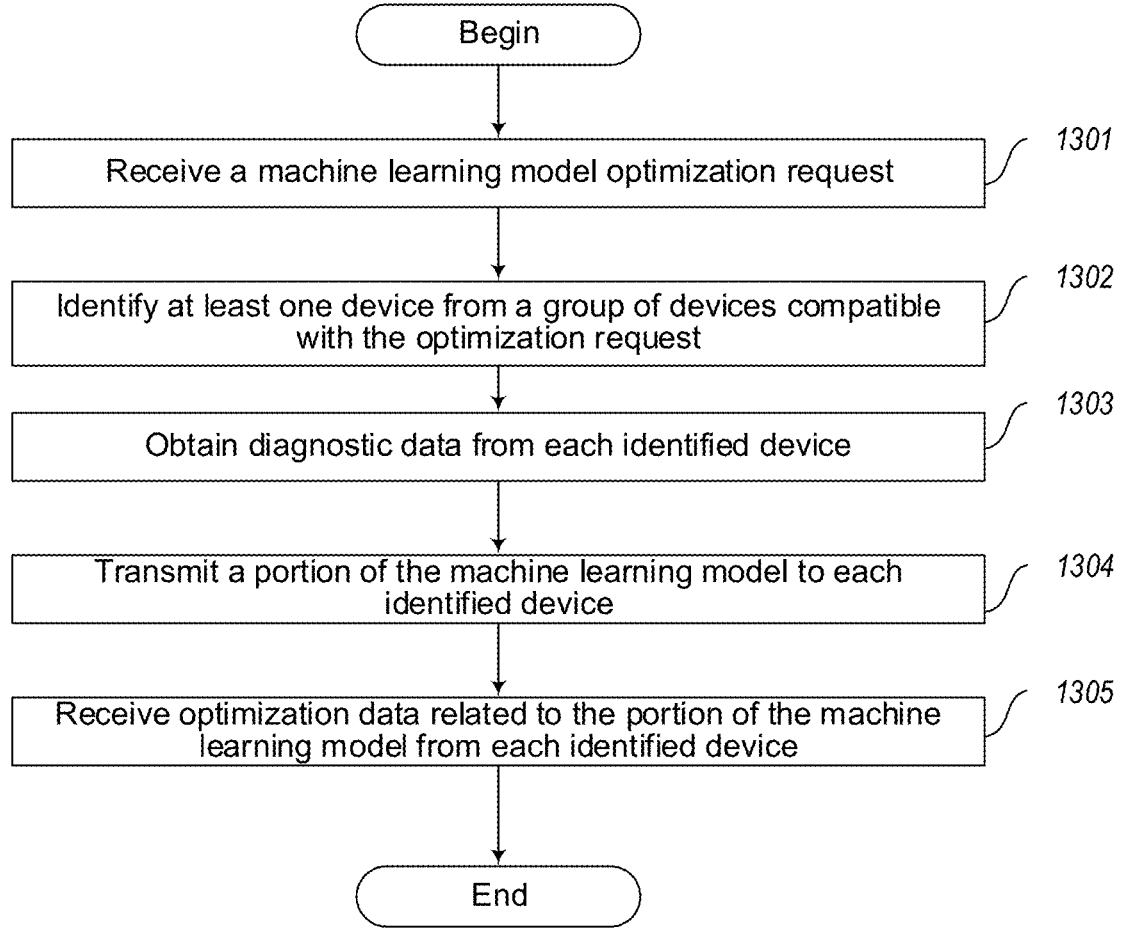
FIG. 13 is a process for managing a device farm performed by the facility in some embodiments.

FIG. 13 is a process for managing a device farm performed by the facility in some embodiments. First, at act 1301, the facility receives a machine learning model optimization request. In some embodiments, the machine learning model optimization request includes at least a model type, model description, a hardware target, etc. At act 1302, the facility identifies at least one device from a group of devices, the "device farm", which are compatible with the optimization request. In some embodiments, a device is compatible with the optimization requests if it includes hardware which matches a hardware target included in the optimization request. In some embodiments, the facility utilizes a schedule when identifying at least on device from the group of devices. In some embodiments, the schedule is based on one or more factors, such as the expected time to finish the optimization request, the status of a user associated with the optimization request, the pending workload, etc. In some embodiments, the facility identifies devices based on a determination of which device became available first, such as by using "first in, first out," "last in, first out," etc., algorithms.

At act 1303, the facility obtains diagnostic data from each identified device. In some embodiments, each device is configured to transmit diagnostic data to the facility periodically. In some embodiments, the facility determines that a device is not active when the device has not sent diagnostic data to the facility within a predetermined period of time. In some embodiments, the diagnostic data includes device information data, such as the data stored in the device information data table depicted in FIG. 14.

FIG. 14 is a device information data table used by the facility in some embodiments. The device information data table includes a Device ID column 1420, a Hardware column 1421, a Diagnostic Data column 1422, an Active column 1423, and an Available column 1424. The Device ID column 1420 includes data indicating a device. The Hardware column 1421 includes data indicating the hardware used by the device. The Diagnostic Data column 1422 includes data indicating the diagnostic status of the device, such as resource usage, the devices ability to connect with a device tracker, uptime, etc. The Active column 1243 includes data indicating whether the device active and able to receive data. In some embodiments, the facility uses the data stored in the Active column 1243 to maintain an active device pool. The Available column 1424 includes data indicating whether the device is currently available to generate optimization result data. For example, at row 1401, the device number 817 includes an NVIDIA V100 graphics card and an Intel Xeon processor. The device also has 90% CPU usage, a stable connection, and 50% memory usage. The device at row 1401 is also active and able to received data, however it is not available to generate optimization result data. In contrast, the device at row 1403 is both active and available to generate optimization result data.

Returning to FIG. 13, at act 1304, the facility transmits an implementation of a portion of the machine learning model to each of the identified device. In some embodiments, the facility determines which devices of the identified devices should receive the implementation of a portion of the machine learning model. In some embodiments, the facility transmits the implementation of a portion of the machine learning model as binary code. In some embodiments, the facility transmits additional configuration parameters to the device along with the implementation of a portion of the machine learning model. In some embodiments, the implementation of a portion of the machine learning model includes compiled code. In some embodiments, the implementation of a portion of the machine learning model includes uncompiled code. In some embodiments, where the implementation of a portion of the machine learning model includes uncompiled code, the device is used to compile the code. In some embodiments, the implementation of a portion of the machine learning model is included in a "work item" which is transmitted to the device. In some embodiments, the work item includes additional information used by the device for executing the implementation of a portion of a machine learning model, such as instructions to compile code representing the implementation of a portion of the machine learning model, configuration parameters, etc. In some embodiments, the work item is idempotent, and can be killed or restarted multiple times.

At act 1305, the facility receives optimization result data related to the implementation of a portion of the machine learning model from each identified device that received an implementation of a portion of the machine learning model. In some embodiments, where the facility has not received the optimization result data after a predetermined period of time, the facility marks the device as available to receive another implementation of a portion of the machine learning model. In some embodiments, the facility receives an indication from a device that the device did not fully execute the implementation of a portion of the machine learning model. In some embodiments, the device attempts to fully execute the implementation of a portion of the machine learning model if the device was unable to fully execute the implementation.

Figure 15:
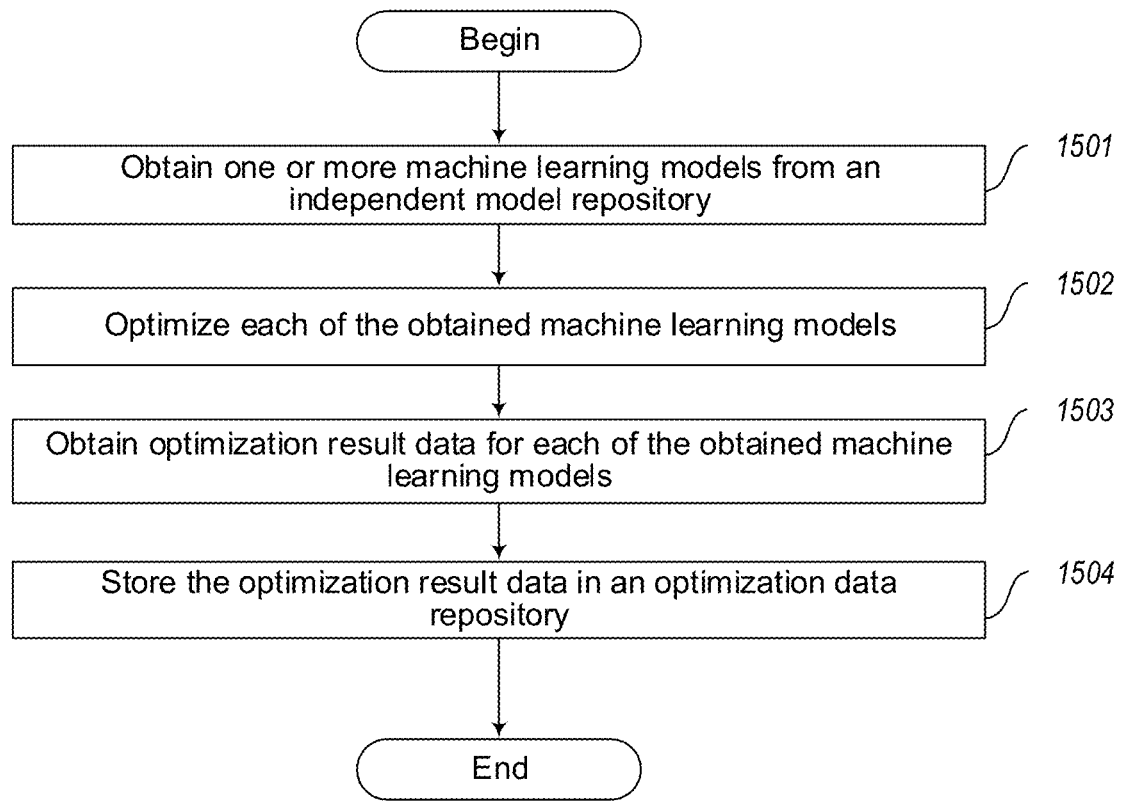
FIG. 15 is a process to optimize machine learning models from an independent model repository performed by the facility in some embodiments.

FIG. 15 is a process to optimize machine learning models from an independent model repository performed by the facility in some embodiments. At act 1501, the facility obtains one or more machine learning models from an independent model repository. In some embodiments, when obtaining the one or more machine learning models, the facility obtains information describing the model such as a model description, a hardware target, a model type, training data, testing data, etc. At act 1502, the facility optimizes each of the obtained machine learning models. In some embodiments, the facility utilizes the process described in connection with FIG. 6 to optimize each of the obtained models. In some embodiments, the facility optimizes each of the obtained models for one or more hardware targets, including those not included in the information describing the model. At act 1503, the facility obtains optimization data for each of the obtained machine learning models. At act 1504, the facility stores the optimization result data in an optimization data repository. In some embodiments, the facility periodically performs the process to optimize machine learning models from an independent model repository described in connection with FIG. 2.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents configured to cause a computing device to perform a method for optimizing a machine learning model, none of the instances of computer-readable media constituting a transitory propagating signal per se, the method comprising:
    obtaining a description of a machine learning model;
    obtaining an indication of a hardware target for evaluating the machine learning model;
    using the indicated hardware target to retrieve optimization result data from a repository of optimization result data;
    optimizing the machine learning model based on the retrieved optimization result data, the hardware target, and the description of the machine learning model; and
    causing the machine learning model to be executed on hardware specified by the hardware target.

2. The one or more instances of computer-readable media of claim 1, wherein the description of the machine learning model is expressed via a CoreML framework.

3. The one or more instances of computer-readable media of claim 1, wherein the description of the machine learning model is expressed via an ONNX framework.

4. The one or more instances of computer-readable media of claim 1, wherein the repository of optimization result data includes one or more stored machine learning model descriptions and wherein the optimization result data is retrieved based on comparing the description of the machine learning model to the one or more stored machine learning model descriptions.

5. The one or more instances of computer-readable media of claim 1, wherein the machine learning model is untrained.

6. The one or more instances of computer-readable media of claim 5, further comprising:
    obtaining training data for training the machine learning model; and
    training the optimized machine learning model based on the training data.

7. The one or more instances of computer-readable media of claim 1, wherein the machine learning model has been trained.

8. The one or more instances of computer-readable media of claim 7, further comprising:
    obtaining test data for the machine learning model;
    obtaining pre-optimized results, the pre-optimized results including the results of the test data for the machine learning model before the machine learning model has been optimized;

obtaining one or more optimized versions of the machine learning model;
applying the test data to each of the one or more optimized versions of the machine learning model to obtain optimized results; and
determining whether the difference between the pre-optimized results and the optimized results are within a predetermined threshold.

9. The one or more instances of computer-readable media of claim 7, wherein optimizing the machine learning model further comprises altering the weights of the model.

10. The one or more instances of computer-readable media of claim 1, wherein optimizing the machine learning model further comprises altering the code for operators used by the machine learning model.

11. A system for optimizing machine learning models, the system comprising:
a repository configured to store optimization logs containing optimization result data for machine learning models; and
a computing device configured to:
receive an indication of a description of a machine learning model;
receive an indication of a hardware target for evaluating the machine learning model;
use the indicated hardware target to retrieve optimization result data from the repository;
optimize the machine learning model based on the retrieved optimization result data, the hardware target, and the description of the machine learning model; and
cause the machine learning model to be executed on hardware specified by the hardware target.

12. The system of claim 11, wherein the description of the machine learning model is expressed via a CoreML framework.

13. The system of claim 11, wherein the description of the machine learning model is expressed via an ONNX framework.

14. The system of claim 11, further comprising:
the repository is further configured to associate one or more stored model types and one or more stored hardware targets to the optimization result data for machine learning models; and
a computing device is further configured to:
obtain a model type of the machine learning model based on the description of the machine learning model; and
retrieve the optimization result data from the repository based on a comparison of at least the hardware target to the one or more stored hardware targets and the model type to the one or more stored model types.

15. The system of claim 11, wherein the machine learning model is not trained.

16. The system of claim 15, wherein the computing device is further configured to:
obtain training data for training the machine learning model; and
train the optimized machine learning model based on the training data.

17. The system of claim 11, wherein the machine learning model has been trained.

18. The system of claim 17, wherein the computing device is further configured to:
obtain test data for the machine learning model;
obtain pre-optimized results, the pre-optimized results including the results of the test data for the machine learning model before the machine learning model has been optimized;
obtain one or more optimized versions of the machine learning model;
apply the test data to each of the one or more optimized versions of the machine learning model to obtain optimized results; and
determine whether the difference between the pre-optimized results and the optimized results are within a predetermined threshold.

19. The system of claim 17, wherein optimizing the machine learning model includes altering the model weights.

20. The system of claim 11, wherein optimizing the machine learning model includes altering the code for operators within the machine learning model.

21. One or more storage devices collectively storing a machine learning model optimization result data structure, none of the storage devices constituting a transitory propagating signal per se, the data structure comprising:
information specifying a machine learning model, including a description of the machine learning model;
information specifying a hardware target for evaluating the machine learning model; and
information specifying optimization result data, such that, the information specifying the optimization result data, the hardware target, and the description of the machine learning model are usable to optimize the machine learning model, and
the optimized machine learning model is caused to be executed by hardware specified by the hardware target.

22. The one or more storage devices of claim 21, wherein the description of the machine learning model is expressed via a CoreML framework.

23. The one or more storage devices of claim 21, wherein the description of the machine learning model is expressed via an ONNX framework.

24. The one or more storage devices of claim 21, wherein the information specifying optimization result data further comprises information specifying a model type and information specifying a hardware target.

25. The one or more storage devices of claim 21, wherein the machine learning model is an untrained machine learning model.

26. The one or more storage devices of claim 21, wherein the machine learning model is a trained machine learning model.

27. The one or more storage devices of claim 26, further comprising:
information specifying test data for the machine learning model;
information specifying pre-optimized output of the machine learning model based on the test data, the pre-optimized output being obtained before the machine learning model is optimized; and
information specifying optimized output of the machine learning model based on the test data, the optimized output being obtained by applying the test data based to one or more optimized versions of the machine learning model,
such that the pre-optimized output and the optimized output is usable to determine whether the difference between the pre-optimized output and the optimized output is within a predetermined threshold.

28. The one or more storage devices of claim 26, further comprising information specifying weights for the machine learning model.

\* \* \* \* \*